(12) United States Patent
Mutha et al.

(10) Patent No.: US 12,321,318 B2
(45) Date of Patent: Jun. 3, 2025

(54) FRAMEWORK FOR ALLOWING COMPLEMENTARY WORKLOADS/PROCESSES TO BRING IN HEAVY LOAD ON A FILE COLLABORATION PLATFORM

(71) Applicant: Microsoft Technology Licensing, LLC, Redmond, WA (US)

(72) Inventors: Akshay Navneetlal Mutha, Sammamish, WA (US); Nishand Lalithambika Vasudevan, Redmond, WA (US); Abhishek Anil Kakhandiki, Bellevue, WA (US); Niloofar Hezarjaribi, Bellevue, WA (US); Reetu Kamath, Redmond, WA (US); Zi Gu, Redmond, WA (US); Chenying Yang, Redmond, WA (US); Shivraj Prakash Ghatkar, Kirkland, WA (US); Albert Shen, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 226 days.

(21) Appl. No.: 17/163,127

(22) Filed: Jan. 29, 2021

(65) Prior Publication Data

US 2022/0188271 A1 Jun. 16, 2022

Related U.S. Application Data

(60) Provisional application No. 63/123,960, filed on Dec. 10, 2020.

(51) Int. Cl.
*G06F 16/00* (2019.01)
*G06F 9/50* (2006.01)
*G06F 16/176* (2019.01)

(52) U.S. Cl.
CPC .............. *G06F 16/176* (2019.01); *G06F 9/50* (2013.01)

(58) Field of Classification Search
CPC ......... G06F 16/176; G06F 9/50; H04L 67/10; G06Q 10/101
See application file for complete search history.

(56) References Cited

U.S. PATENT DOCUMENTS

| 7,870,294 B2 | 1/2011 | Braddy et al. |
| 7,895,353 B2 | 2/2011 | Jansson et al. |

(Continued)

FOREIGN PATENT DOCUMENTS

CN 109857574 A 6/2019

OTHER PUBLICATIONS

"Deficit Round Robin", Retrieved from: https://web.archive.org/web/20200518185347/https:/en.wikipedia.org/wiki/Deficit_round_robin, May 18, 2020, 4 Pages.

(Continued)

*Primary Examiner* — Dinku W Gebresenbet
(74) *Attorney, Agent, or Firm* — Han Gim; Newport IP, LLC

(57) ABSTRACT

A data processing system for processing requests for features at a file collaboration platform implements receiving, at the file collaboration platform, a request from a client device to invoke a requested service on one or more files, wherein the requested service is associated with a feature provided by the file collaboration platform; determining a current operating status of the file collaboration platform; obtaining a feature-specific policy associated with the feature associated with the request; determining whether the requested service is allowed by the file collaboration platform based on the current operating status of the file collaboration platform and the feature-specific policy asso- (Continued)

ciated with the feature; allocating capacity to the request at the file collaboration platform for performing the request responsive to determining that the requested service is allowed; and sending a first message to the client device indicating that the client device may invoke the requested service.

21 Claims, 9 Drawing Sheets

(56) References Cited

U.S. PATENT DOCUMENTS

| | | | |
|---|---|---|---|
| 8,402,470 B2 | 3/2013 | Chiang et al. | |
| 8,799,322 B2 | 8/2014 | Demilo et al. | |
| 9,015,248 B2 | 4/2015 | Barreto et al. | |
| 9,189,645 B2* | 11/2015 | Borzycki | H04L 67/04 |
| 9,195,971 B2* | 11/2015 | McConnell | G06Q 10/10 |
| 9,628,329 B2 | 4/2017 | Singh et al. | |
| 2001/0047385 A1* | 11/2001 | Tuatini | H04L 67/51 |
| | | | 709/219 |
| 2006/0010125 A1* | 1/2006 | Beartusk | G06Q 10/10 |
| 2012/0297046 A1* | 11/2012 | Raja | H04L 41/5009 |
| | | | 709/223 |
| 2014/0032691 A1* | 1/2014 | Barton | H04W 12/08 |
| | | | 709/206 |
| 2015/0081773 A1* | 3/2015 | Ansel | G06F 16/958 |
| | | | 707/639 |
| 2016/0085392 A1* | 3/2016 | Dargahi | G06Q 10/10 |
| | | | 715/738 |
| 2016/0088023 A1* | 3/2016 | Handa | H04L 67/02 |
| | | | 709/219 |
| 2017/0147796 A1* | 5/2017 | Sardesai | G06F 21/6218 |
| 2019/0068752 A1* | 2/2019 | Brooks | H04L 67/01 |
| 2020/0322426 A1* | 10/2020 | Nethercutt | H04L 65/4015 |
| 2020/0334194 A1 | 10/2020 | Tran | |
| 2021/0014287 A1* | 1/2021 | Kimball | H04L 65/4015 |

OTHER PUBLICATIONS

"Weighted Fair Queueing", Retrieved from: https://web.archive.org/web/20200102193850/https:/en.wikipedia.org/wiki/Weighted_fair_queueing, Jan. 2, 2020, 4 Pages.

Byrne, Joe, "Why Not just use Google Drive as a Document Management System?", Retrieved from: https://www.cognidox.com/blog/why-not-just-use-google-drive-as-a-document-management-system, Retrieved Date: Nov. 10, 2020, 9 Pages.

Chillakanti, Pratap, "Secure Collaboration in Onboarding", In Thesis of Middlesex University, Aug. 2013, 256 Pages.

"International Search Report and Written Opinion Issued in PCT Application No. PCT/US21/058510", Mailed Date: Mar. 9, 2022, 11 Pages.

\* cited by examiner

FRAMEWORK FOR ALLOWING COMPLEMENTARY WORKLOADS/PROCESSES TO BRING IN HEAVY LOAD ON A FILE COLLABORATION PLATFORM

CROSS-REFERENCE TO RELATED APPLICATIONS

This application claims the benefit of priority from pending U.S. Provisional Patent Application Ser. No. 63/123,960, filed on Dec. 10, 2020, and entitled "Framework for allowing complementary workloads/processes to bring in heavy load on a file collaboration platform," which is incorporated herein by reference.

BACKGROUND

A file collaboration platform, such as Microsoft OneDrive for Business™, may provide services including but not limited to file hosting, file synchronization, file sharing, and/or other such services. File collaboration platforms may serve a large number of customers. Some file collaboration platforms may serve hundreds of millions of customers, which require significant computing and networking resources. To handle this load, file collaboration platforms may be implemented using server farms. A server farm is a logical collection of servers that are working together to provide a service or services to one or more customers of the file collaboration platform.

Some of the services provided by the file collaboration platform may be "complementary" services, which are services that enhance the user experience and provide useful functionality to the user but are not time sensitive services. However, some of these complementary services may utilize a significant amount of computing and/or network resources, and providing such computing and network resources is expensive. Furthermore, overutilization of such complementary services may negatively impact the user experience by consuming resources that could otherwise be used to support time-sensitive requests. Hence, there is a need for improved systems and methods of handling complementary services without compromising the user experience provided by the services supported by the file collaboration platform.

SUMMARY

An example data processing system according to the disclosure may include a processor and a computer-readable medium storing executable instructions. The instructions when executed cause the processor to perform operations including receiving, at a file collaboration platform, a request from a client device to invoke a requested service on one or more files, wherein the requested service is associated with a feature provided by the file collaboration platform; determining a current operating status of the file collaboration platform; obtaining a feature-specific policy associated with the feature associated with the request; determining whether the requested service is allowed by the file collaboration platform based on the current operating status of the file collaboration platform and the feature-specific policy associated with the feature; allocating capacity to the request at the file collaboration platform for performing the request responsive to determining that the requested service is allowed; and sending a first message to the client device indicating that the client device may invoke the requested service.

An example method implemented in a data processing system for processing requests for features at a file collaboration platform includes receiving, at the file collaboration platform, a request from a client device to invoke a requested service on one or more files, wherein the requested service is associated with a feature provided by the file collaboration platform; determining a current operating status of the file collaboration platform; obtaining a feature-specific policy associated with the feature associated with the request; determining whether the requested service is allowed by the file collaboration platform based on the current operating status of the file collaboration platform and the feature-specific policy associated with the feature; allocating capacity to the request at the file collaboration platform for performing the request responsive to determining that the requested service is allowed; and sending a first message to the client device indicating that the client device may invoke the requested service.

An example computer-readable storage medium on which are stored instructions. The instructions when executed cause a processor of a programmable device to perform functions of receiving, at a file collaboration platform, a request from a client device to invoke a requested service on one or more files, wherein the requested service is associated with a feature provided by the file collaboration platform; determining a current operating status of the file collaboration platform; obtaining a feature-specific policy associated with the feature associated with the request; determining whether the requested service is allowed by the file collaboration platform based on the current operating status of the file collaboration platform and the feature-specific policy associated with the feature; allocating capacity to the request at the file collaboration platform for performing the request responsive to determining that the requested service is allowed; and sending a first message to the client device indicating that the client device may invoke the requested service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are provided herein for addressing the technical problem of providing complementary services on a file collaboration platform without compromising the user experience provided by the services supported by the file collaboration platform. The techniques provided herein provide a technical solution to this technical problem by associating a feature-specific policy with each feature provided by the file collaboration platform. The feature-specific policy defines when that feature may bring more traffic to the file collaboration platform. The policies may be maintained on the file collaboration platform and/or on the client devices that may use the services provided by the file collaboration platform. A request from a client device for a particular service may be allowed or rejected based on the policies. The policies provided herein may determine whether a request may be serviced based on the file size associated with request. A technical benefit of this approach is that a user may be brought onboard by the file collaboration platform so that their request may be serviced as soon as the file collaboration platform has sufficient resources available to handle the request. As a result, users who have a large number of files that need to be synchronized or otherwise processed by the file collaboration platform will not block other users from obtaining services from the file collaboration platform while their request is being processed. Furthermore, the server-side polices are flexible and may consider various metrics, such as but not limited to, current server health, time of day, CPU usage, memory usage, and/or other resources available, when determining whether to allow or block a particular request from a user. These and other technical benefits of the techniques provided herein will be evident from the examples which follow.

Figure 1:
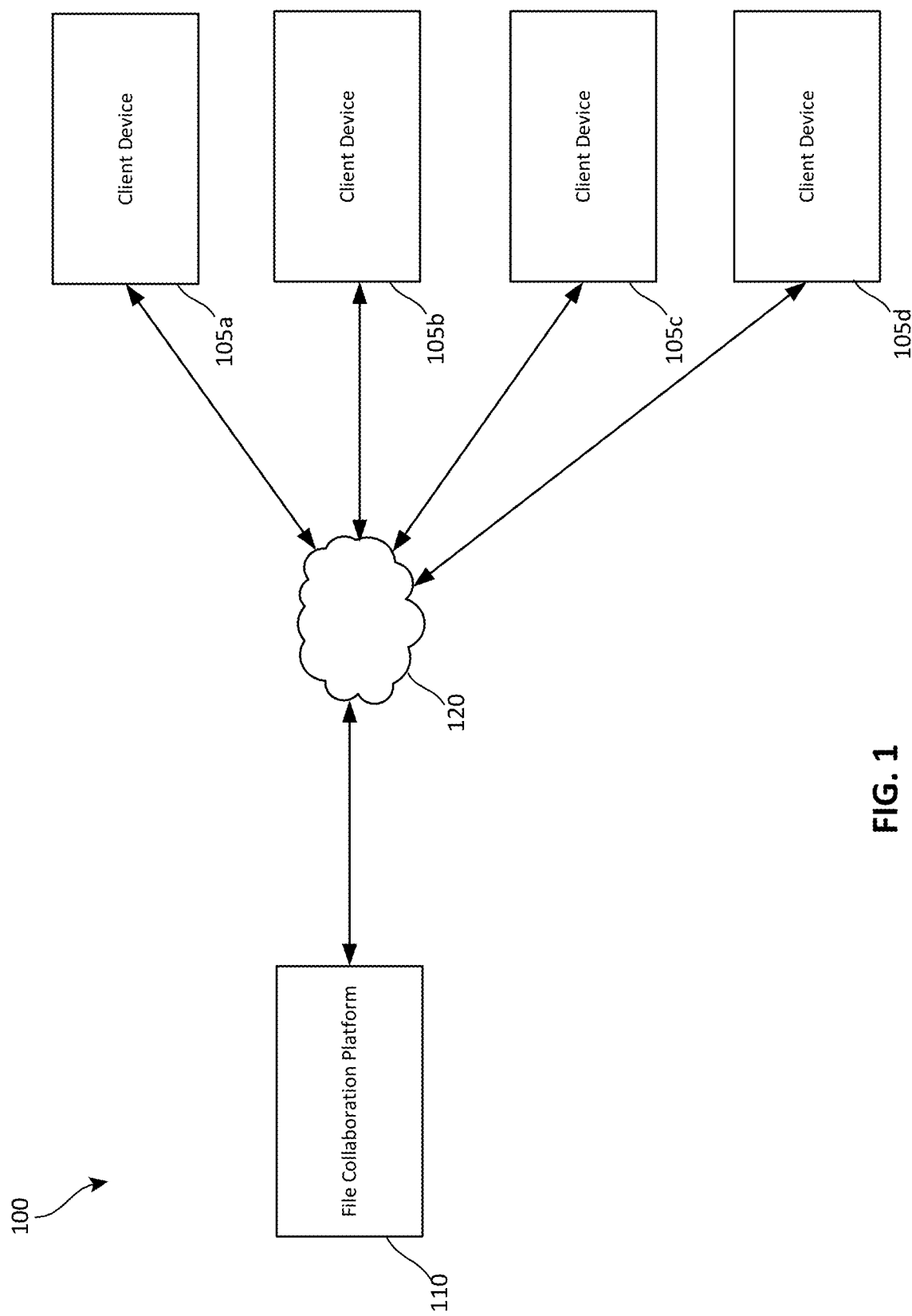
FIG. 1 illustrates an example file collaboration platform in which the techniques disclosed herein may be implemented.

FIG. 1 is a diagram of an example computing environment 100 in which the techniques disclosed herein may be implemented. The computing environment 100 may include file collaboration platform 110 that may implement the techniques presented herein for managing services provided by the file collaboration platform 110. The computing environment 100 may also include client devices 105*a*, 105*b*, 105*c*, and 105*d*.

The file collaboration platform 110 may communicate with the client devices 105*a*, 105*b*, 105*c*, and 105*d* via a network 120. The network 120 may be a public network, a private network, or a combination thereof. At least a portion of the network 120 may be implemented by the Internet.

The file collaboration platform 110 may provide file hosting, file synchronization, file sharing, version management, collaboration, and/or other such services. The file collaboration platform 110 may provide a web-based application or applications for accessing these services from the client devices 105*a*, 105*b*, 105*c*, and 105*d*. The file collaboration platform 110 may provide services to the 105*a*, 105*b*, 105*c*, and 105*d* through a web browser or native application or applications installed on the client devices. The native application or applications may be applications, such as but not limited to, word processing applications, spreadsheet applications, presentation applications, image editing and/or creation applications, and/or other applications configured to utilize one or more of the services of the file collaboration platform 110. Users of the client devices 105*a*, 105*b*, 105*c*, and 105*d* may subscribe with a provider of the file collaboration platform 110 to gain access the services provided by the file collaboration platform 110. The users may be individual subscribers or may be part of an organization that subscribes to the services provided by the file collaboration platform 110. The example of FIG. 1 shows only four client devices for the sake of clarity, but implementation of the file collaboration platform 110 may support many more client devices. As discussed with respect to FIG. 2 below, the file collaboration platform 110 may be implemented by multiple server farms to provide file collaboration services to large numbers of client devices.

The client devices 105*a*, 105*b*, 105*c*, and 105*d* are computing devices that may be implemented as a portable electronic device, such as a mobile phone, a tablet computer, a laptop computer, a portable digital assistant device, a portable game console, and/or other such devices. The client devices 105*a*, 105*b*, 105*c*, and 105*d* may also be implemented in computing devices having other form factors, such as a vehicle onboard computing system, a kiosk, a point of sale system, a video game console, a desktop computer, and/or other types of computing devices. The client devices 105*a*, 105*b*, 105*c*, and 105*d* may include a web browser and/or a native application or applications that may be configured to access the services provided by the file collaboration platform 110. The requests received from the client devices 105*a*, 105*b*, 105*c*, and 105*d* may be distributed among a set of virtual machines implemented by the file collaboration platform 110. Whereas the example implementation illustrated in FIG. 1 includes four client devices, other implementations may include more client devices associated with one or more tenants of the file collaboration platform 110.

Figure 2:
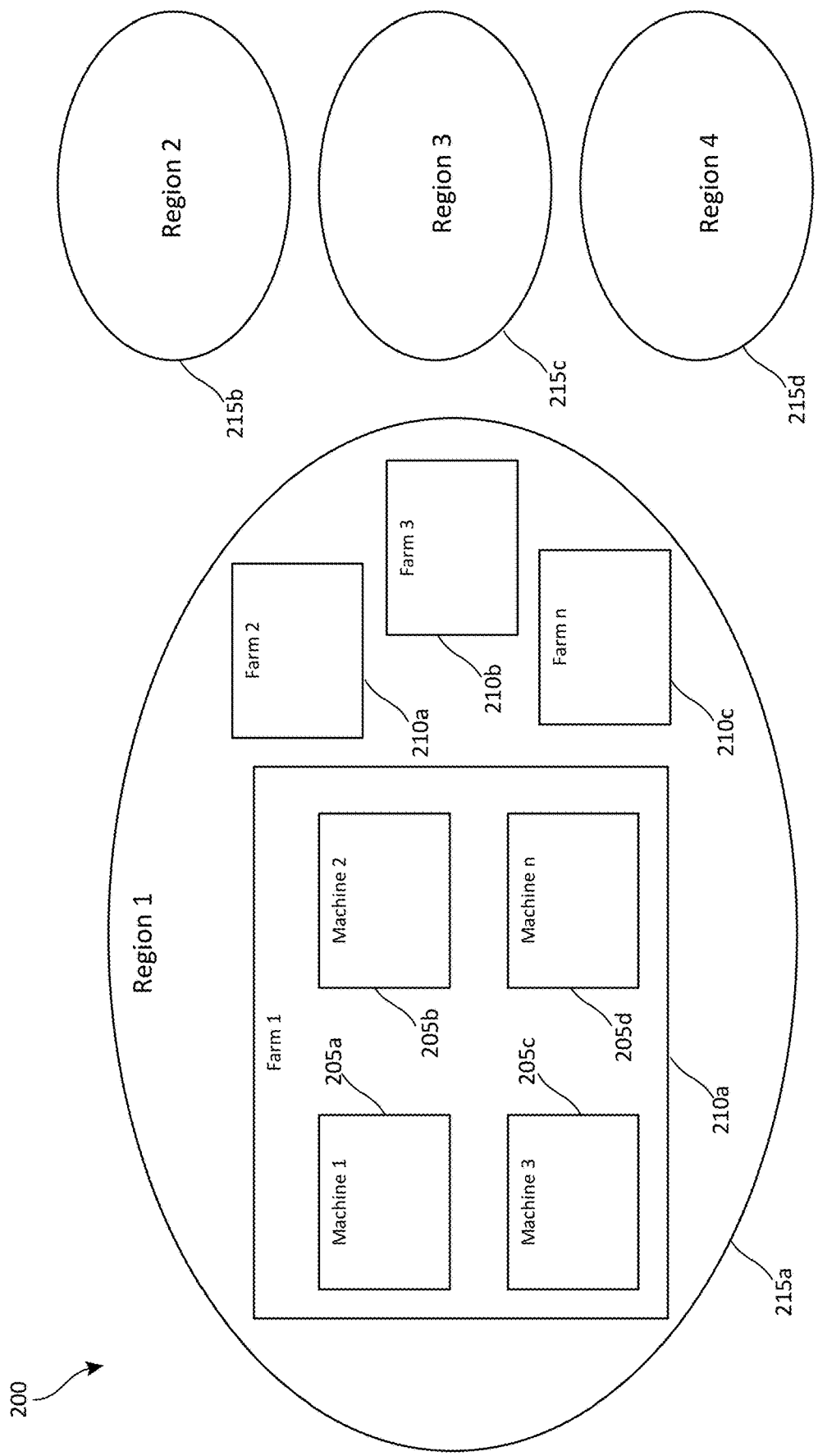
FIG. 2 shows a computing environment 200 that may be used to implement the file collaboration platform 110.

FIG. 2 shows an example computing environment 200 that may be used to implement the file collaboration platform 110. The file collaboration platform 110 includes multiple virtual machines 205*a*, 205*b*, 205*c*, and 205*d* running on a server farm 210*a*. A server farm may include multiple hardware-based servers, and each server may be configured to run one or more virtual machines. The examples shown in FIG. 2 include only four virtual machines, but implementation of a server farm may include many more virtual machines. The server farm 210*a* may include a different number of virtual machines to provide the services of the file collaboration platform 110. Furthermore, as shown in FIG. 2, one or more server farms may be grouped into logical regions that are configured to provide service to a particular geographical area. The example shown in FIG. 2 includes four regions 215a, 215b, 215c, and 215d. However, other implementation may include a different number of regions.

Each server farm may be configured to service requests from multiple customers. As discussed above, the customers may subscribe to the services provided by the file collaboration platform 110 and may be individual subscribers or a part of an organization. Requests from a large customer may be received from multiple client devices and may be distributed across multiple server farms. The examples describe how the computing capacity provided by the server farms may be allocated to service requests from customers.

The file collaboration platform 110 may be configured to provide various services that require immediate servicing by the file collaboration platform 110. These services may include, but are not limited to, synchronizing changes to a shared file, downloading a file that the user has attempted to access on their client device 105, and/or other such services where the actions performed by the file collaboration platform 110 cannot be delayed without impacting the user experience. However, as discussed above, the file collaboration platform 110 may also be configured to perform various complementary services which do not need to be completed immediately by the file collaboration platform. These services may be completed as computing resources become available without negatively impacting the user experience. Negative impacts to the user experience may include but are not limited to slow response times, rejection of new requests, and/or delayed completion of currently pending requests.

Known Folder Migration (KFM) is one such complementary service that may be implemented by the file collaboration platform 110. KFM includes uploading the contents of specified folders on the respective client devices 105 of users to the file collaboration platform 110. The folder may include content that is heavily used by the users that the user may simply wish to have backed up to the file collaboration platform 110, made accessible to the users from multiple devices via the file collaboration platform 110, and/or made available for sharing with other users via the file collaboration platform 110. The contents of the folder are copied and synchronized with the file collaboration platform 110.

KFM may be implemented by an administrator for a company or other organization having multiple users with content stored on client devices that needs to be migrated to the file collaboration platform 110. In some implementations, the migration process may be automatic, and the folders to be migrated to the file collaboration platform 110 may be identified in the feature-specific policy associated with KFM. The files in the folders selected by the user and/or identified by the feature-specific policy are then backed up automatically by the file collaboration platform 110. The backed-up files may be used to recover files on the client devices 105 of the users, to permit the files to be accessed by the users from other client devices 105 associated with the user, to permit the files to be shared with other users who may be collaborating on the files, and/or other for other services that may be provided by the file collaboration platform 110.

The administrator may make a group policy change to the folders to be backed up and/or the client devices 105 for which the KFM is to be performed. This change may propagate to the client devices of everyone in the organization or to the client devices of a large number of users in the organization at the same time. As result, synchronization of content may be triggered on the client devices 105 of the users impacted by the group policy change. In a large corporation, hundreds of thousands of users may be impacted, and their client devices 105 may start the KFM process to migrate millions of files to the file collaboration platform 110. The server farms of the file collaboration platform 110 may quickly become overwhelmed by the sudden increase in requests from the client devices 105. In particular, the CPU utilization of the web front ends (the virtual machines processing the requests) and the SQL server of the file collaboration platform 110 may increase significantly. In response, throttling processes may be triggered, which terminates many of the requests coming into the file collaboration platform 110 to reduce the load on the system. However, this approach results in a poor user experience which can carry over to other users who also utilize the same server farm but are unrelated to the customer for whom the group policy change was implemented.

Solutions such as incrementally rolling out policy changes to a few users at a time will not work for large organizations. The rollout process may take far too long to be completed and may have a low completion rate as no priority is typically associated with this process. Such an incremental rollout may also involve too much manual intervention to manage due to the large number of users and client devices 105 involved. The techniques provided herein enable such large KFM migrations without risking impacting the user experience of the user requesting the migration and/or other users using the same server farm or farms as the user requesting the KFM.

Augmentation is another such complementary service that may be implemented by the file collaboration platform 110. Augmentation is a feature that enhances the indexing capabilities of content. The augmentation feature may analyze rich text documents by running optical character recognition (OCR) on the content to generate a textual representation of the content. The augmentation feature may also generate text for embedded videos or photos. The text for the embedded video may be a transcript of the video. The text for the photos may extract text from photos of notes on paper, a white board, or other writing surface. The notes may be typed or handwritten. The augmentation feature may extract drawings along with the text content. The augmentation feature may also perform other such tasks that can augment the content to improve the ability of the file collaboration platform 110 to index the content. The results of such processing may be quite useful to users by improving the ability to search the indexed content. However, the processing required to generate the index may be very resource intensive. Performing such analysis during peak traffic times may consume resources that could otherwise be allocated toward requests from user's client devices. The analysis of the content may be scheduled for off peak hours. But this approach may result in significant delays in generating the search index for the content. The techniques provided herein can support such augmentation processing in conjunction with high user traffic so that the augmentation processing is not significantly delayed while the user experience is not significantly degraded.

Deployment of updates is yet another complementary service that may be implemented by the file collaboration platform 110. Deploying during peak traffic times means that resources that may otherwise be used for servicing user requests are allocated to deploying the updates. However, delaying the deployment of updates until off-business hours may result in long wait times before all the server farms are updated. The techniques provided herein can support such deployment activity in conjunction with high user traffic so that the deployment is not significantly delayed, and the user experience is not significantly degraded.

FIGS. 4-7 show implementation details of components of a control tower architecture that may be configured to perform the techniques disclosed herein for managing requests in a server farm. The file collaboration platform 110 implements feature-specific policies that indicate when a particular feature may be invoked on the file collaboration platform 110. The feature-specific policies may account for how computationally intensive, memory-intensive, or network-intensive (or a combination thereof) the requested feature is and the current operating conditions of the file collaboration platform 110. Operating conditions, such as the time of day, day of week, current health of the server farm that would be serving the request, the CPU usage and/or memory usage of the server farm, the current available capacity, the number of pending requests for services by client devices, and/or other operating conditions that may be indicative of whether a particular feature may be invoked at that time. The feature-specific policies may also take into account the number of files associated with a request, the size of the files associated with the request, and a number of client devices 105 for which files may need to be synchronized and/or deployed.

The term "available capacity" as used herein refers to a number of virtual units of work that the file collaboration platform 110 may allocate to requests. The virtual units of work may vary depending upon the feature to be invoked on the file collaboration platform 110. Some implementations of the file collaboration platform 110 may implement a file upload feature, and the available capacity may be expressed in terms of files. Other implementations may introduce an upgrade feature that upgrades files on client devices, and the available capacity may be expressed in terms of machines to be upgraded. The file collaboration platform 110 may determine the available capacity based on the computing resources, the memory, network resources, and/or other resources that may be available on the file collaboration platform 110. As requests are received from a client device to invoke a particular feature, the file collaboration platform 110 may determine whether there is sufficient capacity to allow a request to perform the requested feature. As requests are allowed, the available capacity may be decreased by the number of virtual units associated with that type of request.

An administrator of the file collaboration platform 110 may define the feature-specific policies for each of the features provided by the file collaboration platform 110. Some features may not be resource intensive and the feature-specific policy associated with those features may not place any limitations on when the feature may be utilized. Other features which may be more resource intensive, may have limitations placed on when the features may be requested by users. For example, the feature-specific policies for resource intensive complementary features may specify that these features may be requested during non-peak hours. The feature-specific policy may specify one or more time periods for a day which considered as peak periods. The feature-specific policy may also specify different peak periods for different days of the week, as user utilization of the services provided by the file collaboration platform 110 may vary throughout the week. The administrator of the file collaboration platform 110 may set the policy parameters to define what the peak-hours may be for a particular server farm and/or a particular region. As will be discussed in the examples which follow, the client device 105 of a user may interact with the file collaboration platform 110 using a request protocol in which the client device 105 may request a file upload, file synchronization, and/or other feature provided by the file collaboration platform 110, and the file collaboration platform 110 may provide a response allowing the request or rejecting the request. If the request is rejected, the file collaboration platform 110 may suggest how long the client device 105 should wait before resubmitting the request.

The file collaboration platform 110 may be configured to process requests from as many customers as possible at the same time. Onboarding, as used herein, refers to the process of permitting the client device 105 of the user to perform actions related to one or more files associated with the user. The techniques utilized by the control tower architecture described in FIGS. 4-7 measures the available capacity of the server farm and determines whether the server farm has sufficient capacity to onboard an additional user to service their request. This approach allows as many customers have their requests processed as possible and prevents customers having a large number of files and/or very large files from consuming all of the available resources of the server farm and causing the a poor user experience for other customers.

The file collaboration platform 110 also provides a flexible model in which the policies are based on server-side metrics. The server-side policies may consider a variety of factors when determining whether to allow or reject a request for a service from the client device 105 of a customer. These factors may include current server health for the virtual machines and/or the physical server(s) on which the virtual machines of the server farm are implemented, the collective CPU utilization of the virtual machines of the server farm, the collective memory usage of the virtual machines of the server farm, and/or the other resource-related factors that may be used to determine whether a request for a particular features should be allowed or rejected. When a request for a feature is rejected, the file collaboration platform 110 may provide a suggested time interval that the client device 105 should allow to elapse before attempting to resend the request. For example, the file collaboration platform 110 may request that the client device 105 wait sixty seconds before resubmitting the request to allow time for some capacity to become available on the server farm of the file collaboration platform 110 that will be servicing the request. The file collaboration platform 110 may determine the suggested time interval based on the current operation conditions of the collaboration platform 110 and the service or services that were requested.

Figure 3:
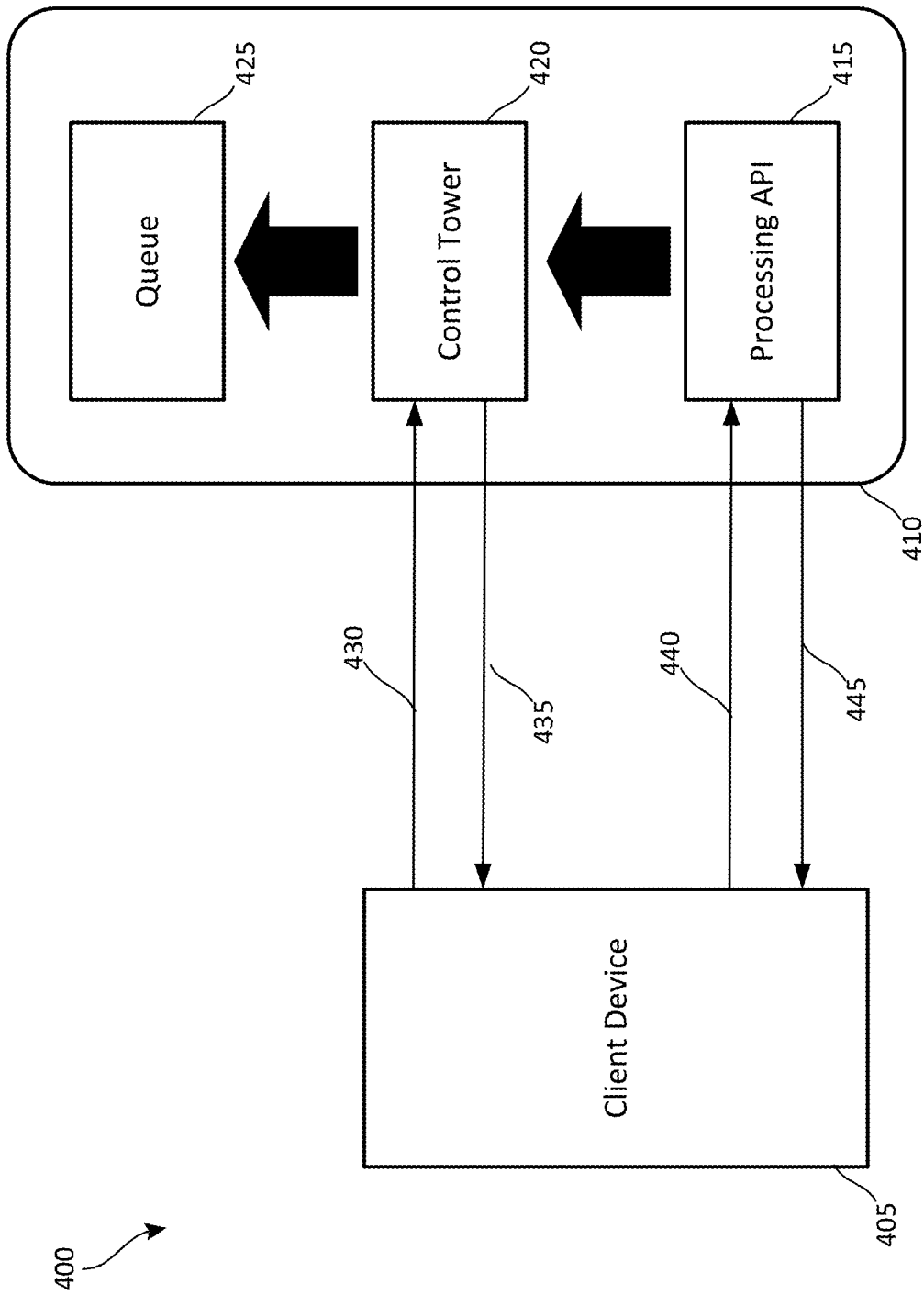
FIG. 3 is a diagram showing an example operating environment in which the client device may interact with the file collaboration platform farm.

FIG. 3 is a diagram showing an example operating environment 400 in which the client device 405 may interact with the file collaboration platform server farm 410. The client device 405 may be substantially similar to the client devices 105 described in the preceding examples, and the file collaboration platform server farm 410 may be implemented by a server farm, such as the server farm 210a, or a plurality of such server farms. The client device 105 may be configured to send requests to a particular server farm of the file collaboration platform 110 based on a geographical region in which the client device 405 is located and/or the file collaboration platform 110 may have a central routing unit (not shown), which is configured to route the request from the client device 405 to a particular server farm.

The file collaboration platform server farm 410 may include a processing application programming interface (API) 415, a control tower unit 420, and a queue 425. The client device 405 may send a request 430 to the file collaboration platform 110, which is routed to the control tower unit 420 for processing. The request 430 may specify a feature being requested and information associated with the requested feature that the control tower unit 420 may use to decide whether to allow or reject the request, such as but not limited to a number of files associated with the request, the size of the files associated with the request, a number of client devices 105 that may be involved in the request, and/or other information that the control tower unit 420 may use to determine whether to allow the request. For example, the request 430 shown in FIG. 3 may a request to deploy 100 files that comprise 1 gigabyte of data. The request may specify how many client devices 105 the deployment involves. If multiple devices are to receive the deployment, the control tower unit 420 can factor this into the decision on whether the allow or reject the request. The file collaboration platform 110 may be configured to support requests for other types of services, such as, but not limited to, those discussed in the preceding examples.

The requests from the client device 405 to the file collaboration platform 110 and the responses from the file collaboration platform 110 to the client device 405 may be implemented using Hypertext Transfer Protocol (HTTP). The requests may be implemented as HTTP requests and the responses may be HTTP responses. Other communications protocols and/or message formats may be used in other implementations.

The request 430 may be generated by a web browser or a native application on the client device 405 and sent to the file collaboration platform 110 via the network 120. The web browser or native application may be configured to communicate with the file collaboration platform 110 to access the services provided by the file collaboration platform 110. The native application may be configured to provide a user interface for accessing various aspects of the services provided by the file collaboration platform. The file collaboration platform 110 may provide a web-based application that may be rendered in the web browser of the client device 405.

The control tower unit 420 may be configured to consider the current operating conditions of the server farm and the feature-specific policy associated with the requested feature to determine whether the allow or reject the request from the client device 405. The current operating conditions of the server may include the current load on the server farm, the position that the request would be within the queue (i.e., how many pending requests are there), and how much available capacity the server farm currently has, day of week and/or time of day, and/or other factors. The feature-specific policy associated with the requested feature may be compared with the current operating conditions to determine whether the control tower unit 420 should allow or reject the request from the client device 405.

If the control tower unit 420 determines that the request should be allowed, the control tower unit 420 may create an entry in the queue 425 for the request and send a response 435 to the client device 405 that the request is allowed. Otherwise, if the control tower unit 420 determines that the request must be rejected due to the current operating conditions of the server farm and the feature-specific policy associated with that feature, then the control tower unit 420 may sent a response 435 to the client device 405 indicating that the request is rejected but may include a suggested retry time for retrying the request. The suggested retry time may be determined based on the predicted operating conditions of the server farm and the feature-specific policy associated with the requested feature.

In response to the request being rejected by the file collaboration platform server farm 410, the client device 405 may wait for a period of time specified in the response 435 from the file collaboration platform server farm 410 before resending the request 430 to the file collaboration platform server farm 410. If the response from the file collaboration platform server farm 410 indicates that the request was allowed, the client device 405 may send a request message 440 to the file collaboration platform server farm 410 that includes the file or files on which the requested feature is to be performed. In the example shown in FIG. 3, the files provided by the client device 405 may include the files that are to be copied to the file collaboration platform 110. The processing API 415 may be configured to receive the request message 440 from the client device 405, verify that the request was allowed by checking the queue 425, and invoking the requested feature. The processing API 415 may send a message 445 to the client device 405 that the request from the client device 405 is being processed. The processing API 415 may also send a follow up message (not shown) that the request has been completed. The client device 105 may present these messages to the user via a user interface of the client device 105.

Figure 4:
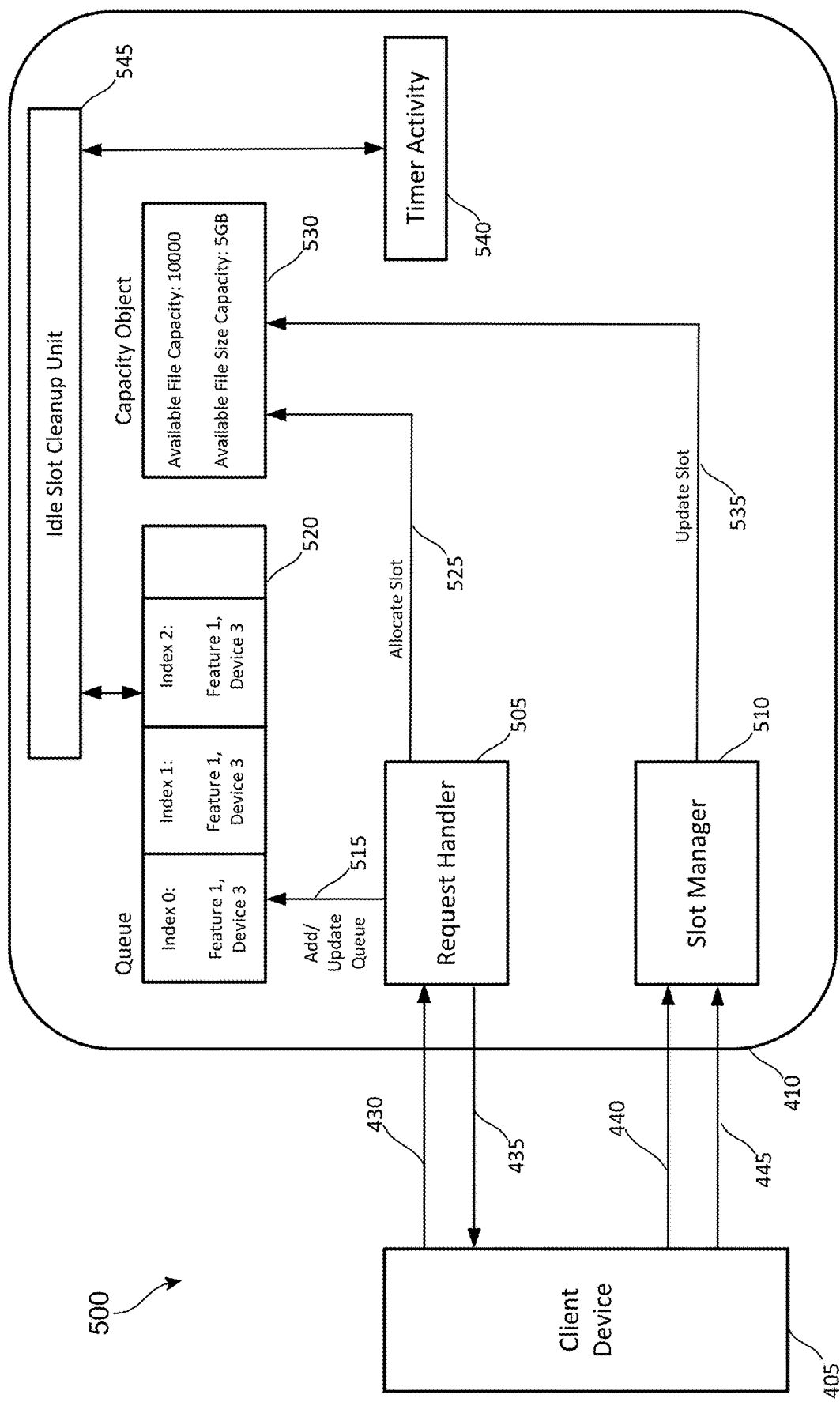
FIG. 4 is a diagram showing an example operating environment in which additional features of the file collaboration platform farm shown in FIG. 3 are depicted.

FIG. 4 is a diagram showing an example operating environment 500 in which additional features of the file collaboration platform server farm 410 shown in FIG. 3 are depicted. The file collaboration platform server farm 410 may implement a request handler 505 and a slot manager 510. The request handler 505 may be implemented by the control tower unit 420 shown in FIG. 3, and the slot manager 510 may be implemented at least in part by the processing API 415.

The request 430 from the client device 405 may be provided to the request handler 505. The request handler 505 may determine whether the request should be allowed as discussed with respect to FIG. 3. This determination will be discussed in greater detail with respect to the example shown in FIG. 5. The example shown in FIG. 4 shows an example process that the request handler 505 may follow once the determination to allow the request has already been made.

The request handler 505 may perform an update operation 515 on the queue 520 to add an entry for the request in response to the request being allowed. The queue 520 may be the same as the queue 425 shown in FIG. 3 and is used to track pending requests that have been allowed. The queue entry may include information identifying the requesting client device 105, the feature requested from the file collaboration platform 110, and a timestamp indicating when the request was made and/or a timestamp when the request was approved.

The request handler 505 may also perform an operation 525 of allocating a slot to the request. Allocating the slot includes assigning a portion of the available capacity of the file collaboration platform server farm 410 for handling the request from the client device 405. The allocated capacity may be determined based on the available capacity of the file collaboration platform server farm 410 and the type of request being requested. Some types of requests may consume less resources and may be allocated a smaller amount of the available capacity. Other types of request may be more resource intensive and may be allocated more of the available capacity. The amount of capacity allocated with the slot may depend in part on the current operating conditions and/or the anticipated operating conditions of the file collaboration platform server farm 410. More capacity may be allocated where there a few requests currently pending and/or during time periods where there is typically lower utilization of the file collaboration platform server farm 410. The request handler 505 may check the available capacity of the file collaboration platform server farm 410 in a capacity object 530 before allocating the slot. The capacity object 530 may be implemented as a shared single instance of an object for tracking the currently available capacity in the server farm. As slots are allocated for request, the capacity object 530 may be updated to reduce the currently available capacity by the amount allocated to the slot. Once the slot has been allocated, the request handler 505 may send the response 435 to the client device 405 indicating that the request has been allowed. The message 435 may, in some implementations, include a slot indicator that identifies the slot allocated to the request. If the request had not been allowed, the request handler 505 instead would send a message to the client device 405 indicating that the request was not allowed, and no updates to the queue 520 or the capacity object 530 would be made in response to the request.

The client device 405 may then send the request message 440 with the files on which the feature is to be performed to the file collaboration platform server farm 410 in response to receiving the message 435 indicating the request was allowed. The slot manager 510 may then receive the request message 440 and any associated files and process the request. The slot manager 510 may be configured to confirm that the request handler 505 did actually allocate a slot to the client device. In some implementations, the request message 440 may include a slot indicator provided to the client device by the request handler 505. The request handler 505 may include the slot indicator in the entry included in the queue 425, and the slot manager 510 may use to verify that the slot was allocated to request. In implementations where the slot indicator is not used, the slot manager 510 may instead use information from the request message 440 to determine whether the request manager 505 approved the request. If no entry in the queue is found, the slot manager 510 may send a message 445 to the client device 405 that the request was not authorized. Otherwise, the slot manager 510 may invoke the requested feature for the requested file or files using the resources allocated in the slot. Once the processing has been completed, the slot manager 510 may notify the client device 405 that processing is completed. The slot manager 510 may also notify the client device 405 when processing has begun.

Another feature of the file collaboration platform server farm 410 is the timer activity unit 540. The timer activity unit 540 ensures that slots allocated to perform certain features are being utilized. Otherwise, the capacity associated with that slot may be recovered and assigned to service other requests. The timer activity unit 540 may monitor when a last action has been taken associated with the request and send a signal to the idle slot cleanup unit 545 to clear the request from the queue and reallocate the capacity associated with the slot if no activity is detected within a predetermined period of time.

One example to illustrate how the activity timer 540 may be used is when the requesting device has gone offline does not send the request message 440 after the request handler 505 sends the message 435 allowing the request. The client device 405 may have been logged off or shut down by a user of the client device 405, network connectivity to client device 405 may have been lost, or other issue has occurred where the client device 405 does not respond. Rather than hold the allocated capacity indefinitely, the timer activity unit 540 may send a signal to the idle slot cleanup unit 545 to clear the request from the queue and reallocate the capacity of the assigned slot once the timer period has elapsed.

In another example to illustrate the activity timer 540, the client device 405 may provide the request message 440 to the file collaboration platform server farm 410, but an activity associated with the requested feature may not be completed. The requested feature may be a deployment, and one or more of the recipient client devices 105 of the files to be deployed may be unreachable. The unreachable client devices 105 may be shut down or experiencing technical problems and the files associated with the deployment may not be provided to the unreachable client devices. The timer activity unit 540 may send a signal to the idle slot cleanup unit 545 to remove the entry associated with the deployment request from the queue 520 and reallocate the capacity associated with the request responsive to the recipient client devices being unreachable for more than the timer period.

Figure 5:
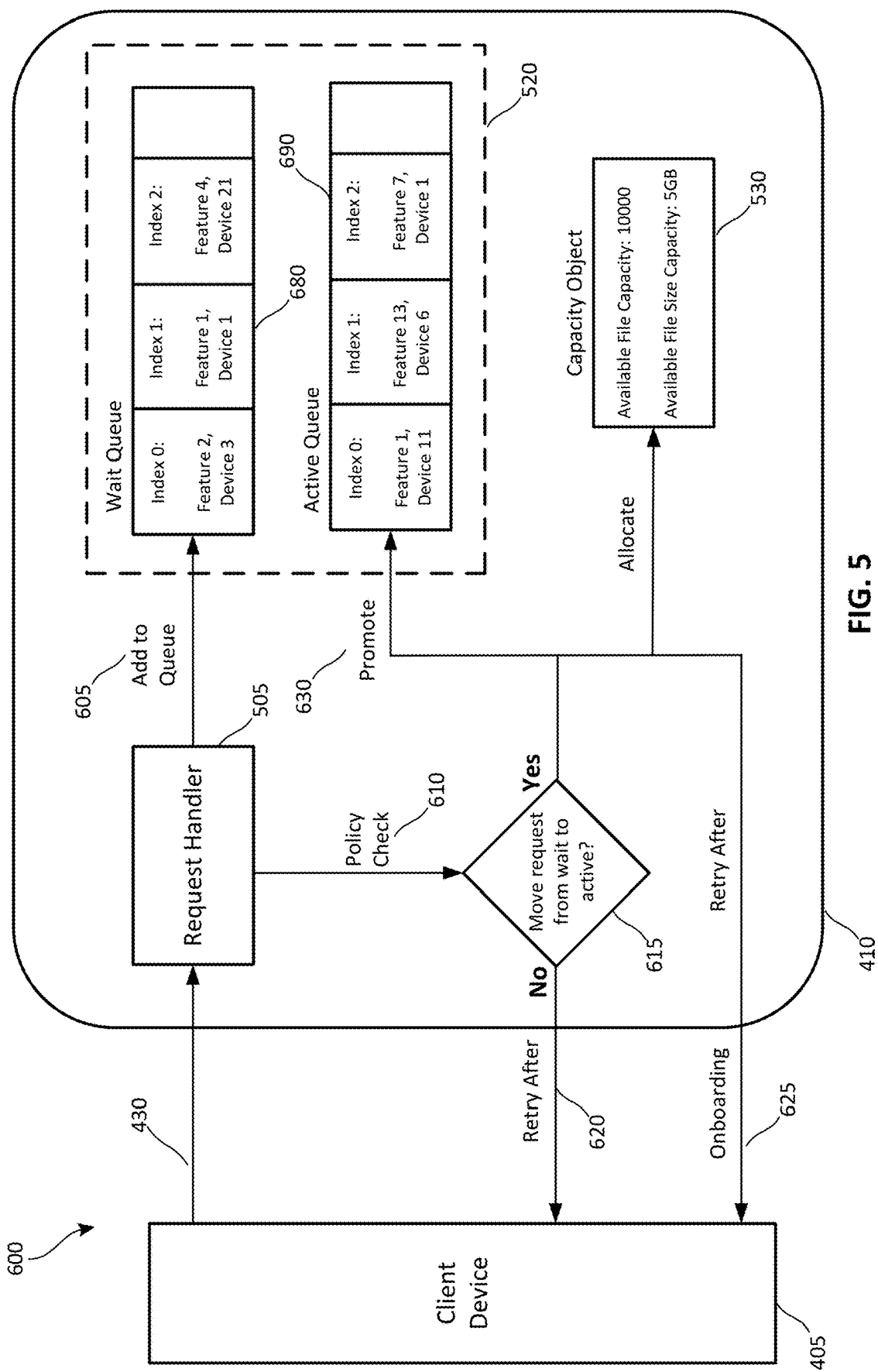
FIG. 5 is a diagram showing additional details of actions that may be performed by the request handler.

FIG. 5 is a diagram 600 showing additional details of actions that may be performed by the request handler 505. The request handler 505 may receive a request 430 from the client device 405. In operation 605, the request handler may add information for the request to the wait queue 680. The queue 425 and queue 520 shown in the preceding figures may be subdivided into two queues: the wait queue 680 and the active queue 690. The wait queue 680 may serve as a holding queue for incoming requests until the request is approved by the request handler 505 and moved to the active queue 690. The wait queue 680 may be used to establish when a request was received from a client device, such as the client device 405. The active queue 690 may include requests that have been moved from the wait queue 680 once the request handler 505 has determined whether to allow or reject the request from the client device 405. Requests may be removed from the active queue 690 once the request has been completed, and a message (not shown) may be sent to the client device 405 indicating that the request has been completed. A message may be sent to an administrator that the request has been completed in some implementations. The administrator may use this information to determine whether a synchronization or other services of the file collaboration platform 110 have been completed for client devices 105 of users associated with the organization for which the administrator manages policies, access control, security, content synchronization, and/or other functions for the client devices 105.

At operation 610, the request handler 505 may be configured to perform a feature-specific policy check as discussed in the preceding examples. The current operating conditions of the server farm may be compared with the feature-specific policy determine whether the request should be allowed or rejected. If the request should be rejected, the process shown in FIG. 5 may halt and the client device 405 may be notified that the request cannot be completed at this time. Otherwise, the request handler 505 may proceed to operation 615 where the request handler 505 determines whether the request may be moved from the wait queue 680 to the active queue 690. The request handler 505 may check the health of the server farm, check whether there is space in the active queue 690 to move the request from the wait queue 680 to the active queue 690, and check whether a slot is available. The request handler 505 may set limits on the number of requests that may be added to the wait queue 680 and the active queue 690. The request handler 505 may also check other operating conditions of the file collaboration platform 110, such as but not limited to whether the request is being processed during typical peak usage periods for the file collaboration platform 110, and whether the feature-specific policy associated with the requested feature permits the request to be performed under these operation conditions.

If one or more of these checks fail, the request handler 505 may keep the request on the wait queue 605, and the request handler 605 may increment a retry counter associated with the request. The client device 405 may attempt to send the request again if the request has previously been rejected. If the retry limit has not been reached, the request handler 505 may proceed to operation 620 in which the client device 405 may be notified to retry the request after a specified period of time has elapsed.

If the checks performed in operation 615 indicate that the request may be processed, the request handler 505 may move the request from the wait queue to the active queue 690 in operation 630. The request handler 505 may also allocate the slot for the request in operation 635. The request handler 505 may update the capacity object 530 to reduce the available capacity by the amount allocated to the slot. The request handler 505 may then notify the client device 405 that the request has been allowed, and the client device 405 may then proceed to send the request message 440 as discussed in the preceding examples.

Figure 6:
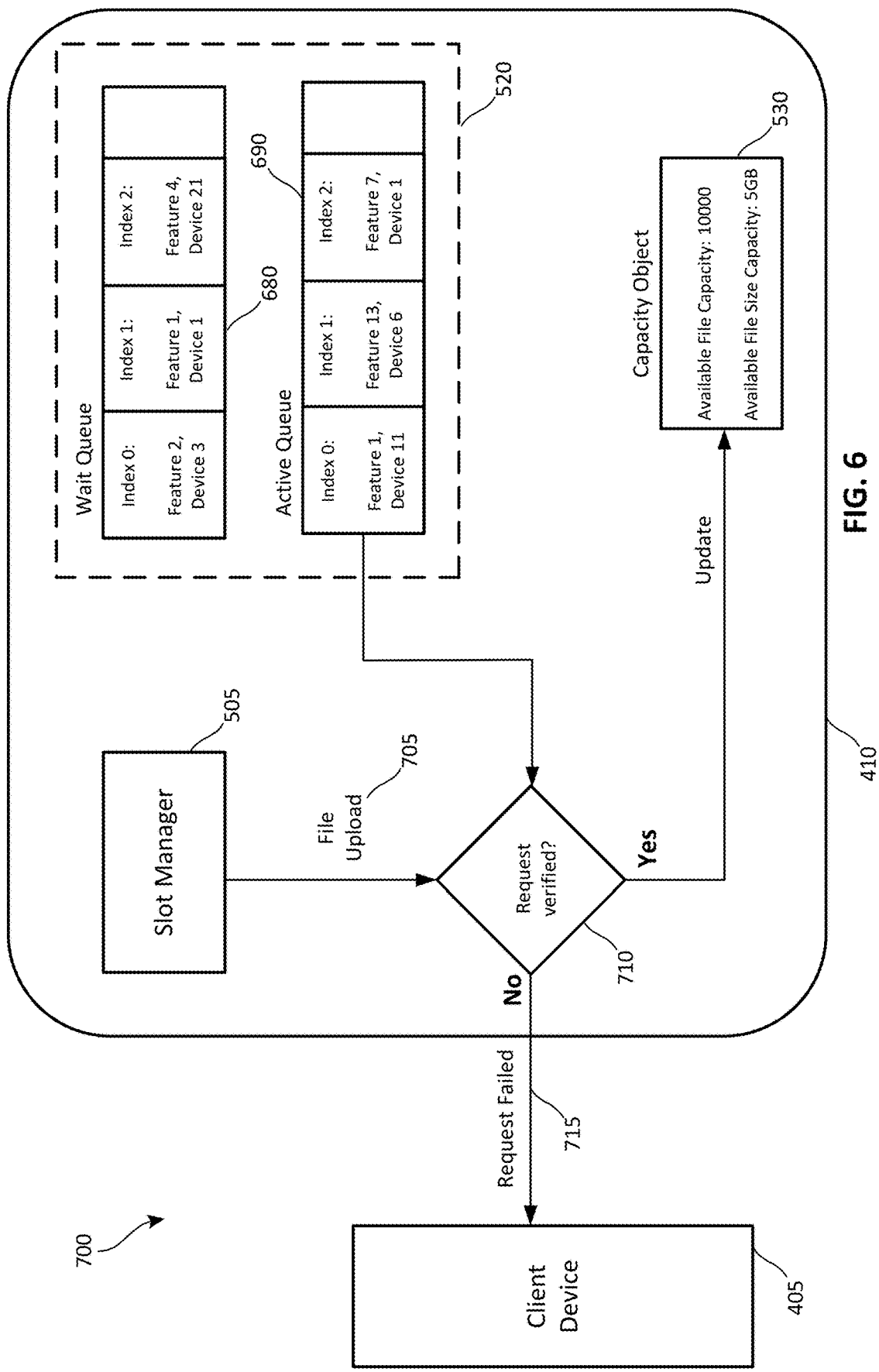
FIG. 6 is a diagram showing additional details of actions that may be performed by the slot manager.

FIG. 6 is a diagram 700 showing additional details of actions that may be performed by the slot manager 510. The slot manager 510 may receive a file upload request from the client device 405 in an operation 705. The file upload request may be the message 440 discussed in the preceding examples and may include one or more files on which a feature of the file collaboration platform 110 has been requested to be performed. In response to receiving the file upload request, the slot manager 510 may perform a verification operation 710 in which the slot manager verifies whether the type of feature requested is supported and the request is in the queue 520 (indicating that the request was approved by the request handler 510 and moved to the active queue 690). If the request is not in the queue 520 or one of the other criteria are not met, then the requested operation is halted and the client device 405 may be notified. Otherwise, the slot manager 510 may perform the requested function of the file collaboration platform 110. The capacity object 530 may then be updated to reallocate the capacity allocated to the request once the request has been completed.

Figure 7:
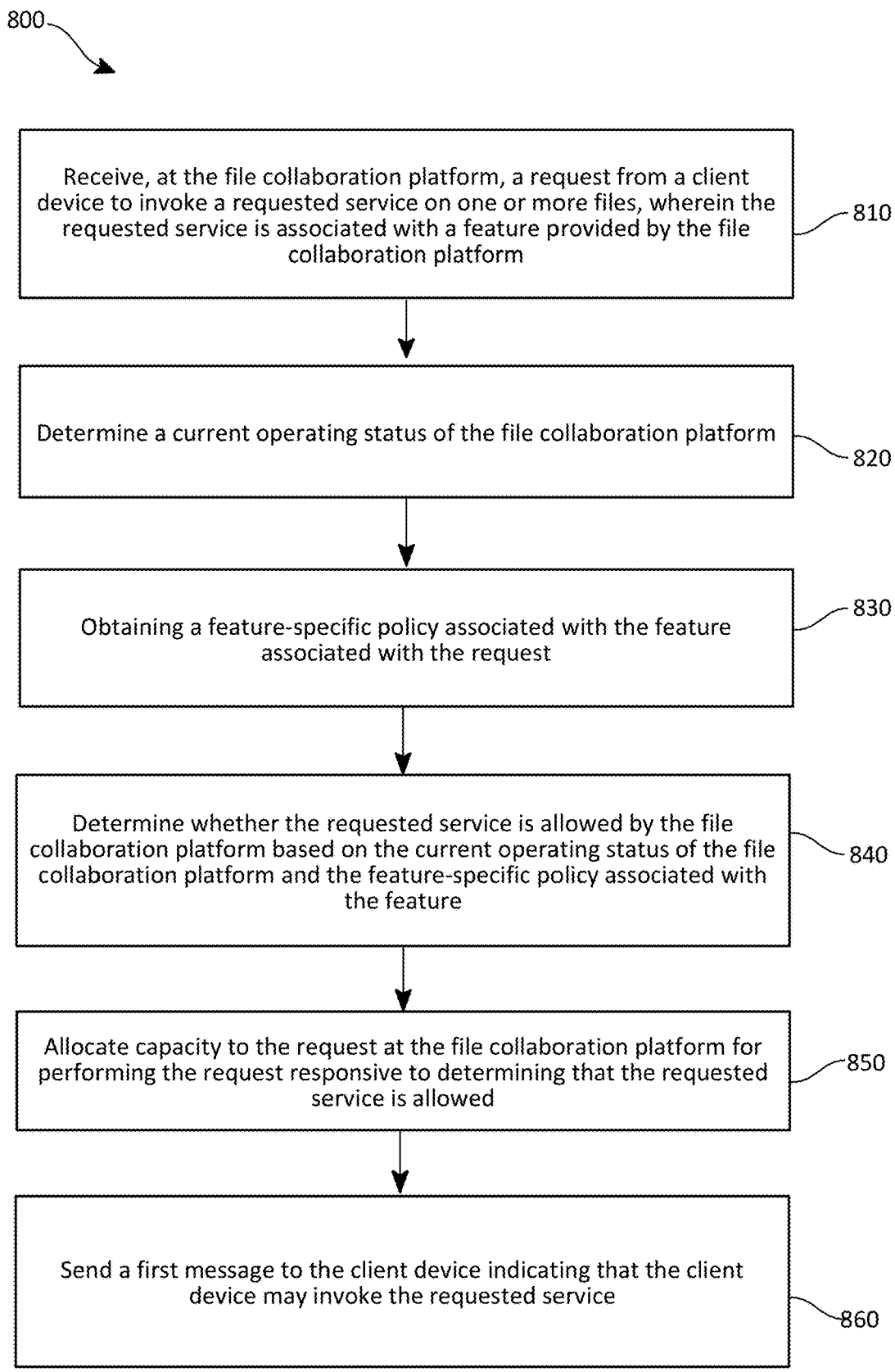
FIG. 7 is a flow chart of an example process for processing requests for features at a file collaboration platform.

FIG. 7 is a flow chart of an example process 800 for processing requests for features at a file collaboration platform. The process 800 may be implemented by the file collaboration platform 110, by the file collaboration platform server farm 410, by the control tower unit 420, and/or by the processing API 415 shown in the preceding examples.

The process 800 may include an operation 810 of receiving, at the file collaboration platform, a request from a client device to invoke a requested service on one or more files, wherein the requested service is associated with a feature provided by the file collaboration platform. The client device 405 may send a request 430 to perform a requested service associated with a particular feature provide by the file collaboration service 415. The request may include information identifying the requested feature to be invoked, a number of files associated with the request, the size of the files associated with the request, a number of client devices 105 that may be involved in the request, and/or other information that the control tower unit 420 may use to determine whether to allow the request.

The process 800 may include an operation 820 of determining a current operating status of the file collaboration platform 110. The current operating conditions of the server may include the current load on the server farm, the position that the request would be within the queue (how many pending requests are there), and how much available capacity the server farm currently has, day of week and/or time of day, and/or other factors.

The process 800 may include an operation 830 of obtaining a feature-specific policy associated with the feature associated with the request. The request 430 received from the client device 405 indicates which feature the client device 405 has requested be invoked on the file collaboration platform 110. The control tower unit 420 may access policy information stored in a memory of the file collaboration platform 110 to obtain feature-specific policy information for the requested feature. The feature-specific policy associated with the requested feature may be compared with the current operating conditions to determine whether the control tower unit 420 should allow or reject the request from the client device 405.

The process 800 may include an operation 840 of determining whether the requested service is allowed by the file collaboration platform based on the current operating status of the file collaboration platform and the feature-specific policy associated with the feature. As discussed in the preceding examples, the request handler 505 of the control tower 420 determines whether a request for a particular feature from a client device 405 may be allowed or rejected.

The process 800 may include an operation 850 of allocating capacity to the request at the file collaboration platform for performing the request responsive to determining that the requested service is allowed. As discussed in the preceding examples, the request handler 505 allocates a slot to the client device 405 to service the request. The slot represents an allocation of the available capacity of the server farm for servicing the request. The overall capacity available for servicing requests is tracked and is reduced for each request that is allowed. Once the request has been completed or has timed out, the capacity allocated to the request is then added back to the available capacity.

The process 800 may include an operation 860 of sending a first message to the client device indicating that the client device may invoke the requested service. The control tower unit 420 may send a message 435 to the client device 405 that indicates that the client device 405 may proceed with the request to invoke the requested feature on the file collaboration platform 110. The client device 405 may then send a request message 440 to the file collaboration platform 110.

The detailed examples of systems, devices, and techniques described in connection with FIGS. 1-8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
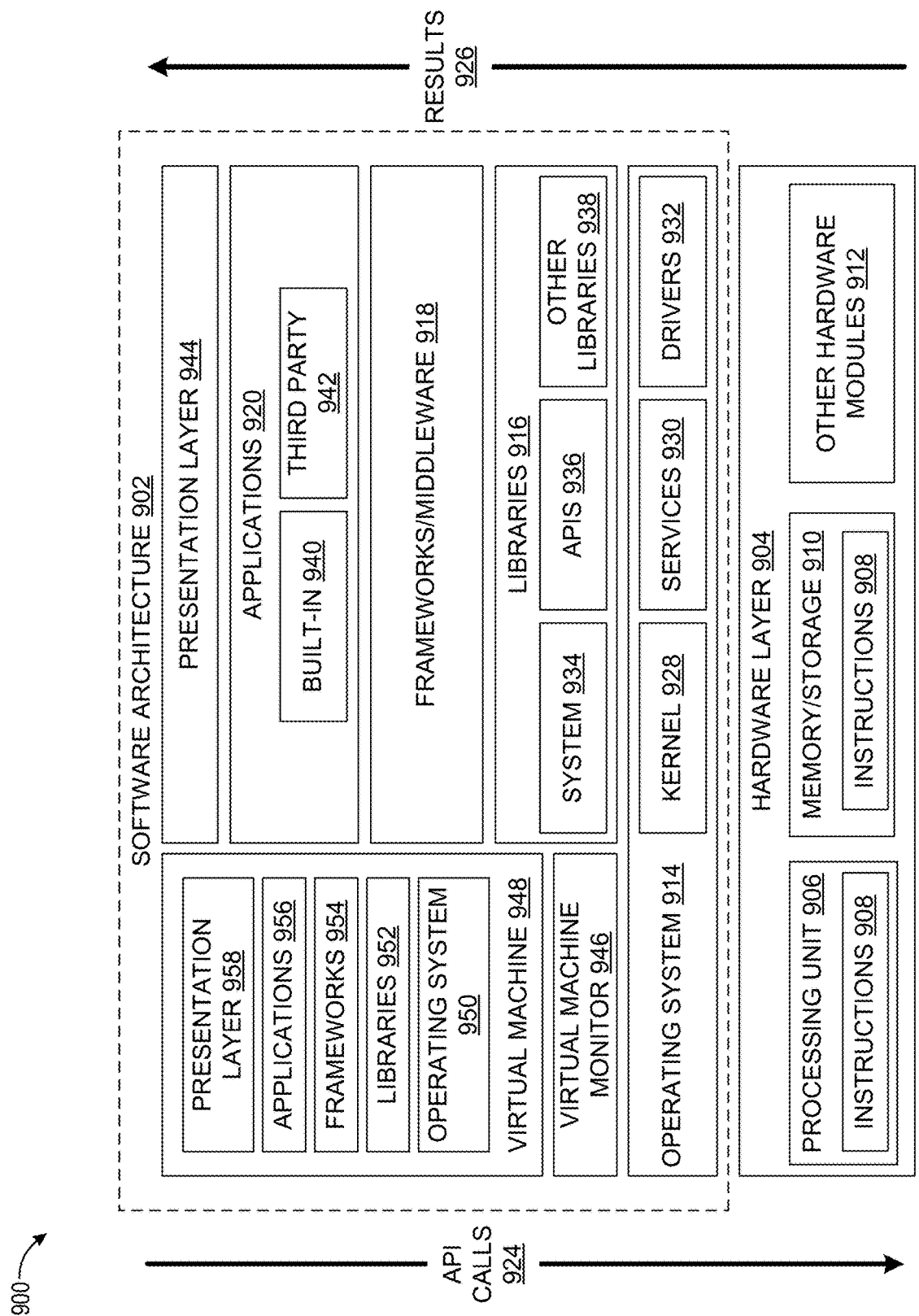
FIG. 8 is a block diagram illustrating an example software architecture, various portions of which may be used in conjunction with various hardware architectures herein described, which may implement any of the features herein described.

FIG. 8 is a block diagram 900 illustrating an example software architecture 902, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 902 may execute on hardware such as a machine 1000 of FIG. 9 that includes, among other things, processors 1010, memory 1030, and input/output (I/O) components 1050. A representative hardware layer 904 is illustrated and can represent, for example, the machine 1000 of FIG. 9. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 906 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 9, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 9:
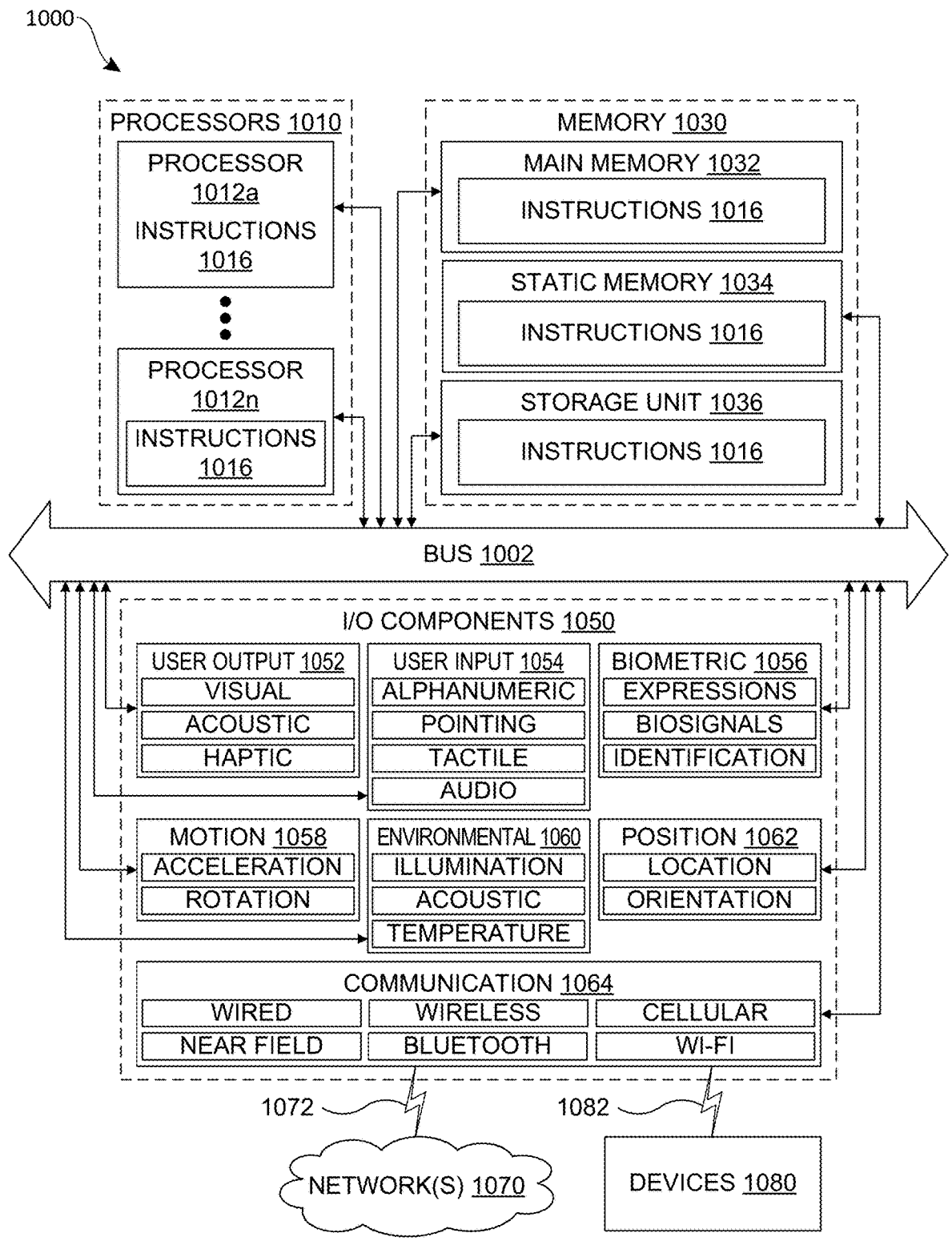
FIG. 9 is a block diagram illustrating components of an example machine configured to read instructions from a machine-readable medium and perform any of the features described herein.

FIG. 9 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 9 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations comprising:
   receiving, at a file collaboration platform, a request from a client device to invoke a requested complementary service on one or more files, wherein the requested complementary service is a service associated with a feature provided by the file collaboration platform that enhances a user experience, is complementary to the file collaboration platform, and is time insensitive;
   in response to receiving the request, adding the request by a request handler module to a wait queue, wherein the wait queue holds requests received by the file collaboration platform that are waiting for the request handler module to determine whether the requests are allowed to be processed by the file collaboration platform;
   determining a current operating status of the file collaboration platform;
   obtaining a feature-specific policy associated with the feature of the requested complementary service of the file collaboration platform, wherein the feature-specific policy includes metrics of the current operating status of the file collaboration platform and the feature-specific policy is used to determine whether to allow or block a particular request for the requested complementary service from the client device to the file collaboration platform;
   determining by the request handler module whether the requested complementary service is allowed by the file collaboration platform based on the current operating status of the file collaboration platform and the feature-specific policy associated with the feature;
   moving the request from the wait queue to an active queue responsive to the request handler module determining that the requested complementary service is allowed based on the current operating status of the file collaboration platform and the feature-specific policy associated with the feature of the requested complementary service, wherein the active queue holds requests that have been approved for processing by the file collaboration platform;
   updating an available capacity of the file collaboration platform in response to moving the request to the active queue;
   allocating capacity to the request at the file collaboration platform for performing the request responsive to determining that the requested complementary service is allowed; and
   sending a first message to the client device indicating that the client device may invoke the requested complementary service.

2. The data processing system of claim 1, wherein the computer-readable medium further comprises instructions for causing the processor to perform operations comprising:
   receiving, from the client device, a first response to the first message invoking the requested complementary service;
   receiving, from the client device, the one or more files on which the requested complementary service is to be performed by the file collaboration platform; and
   invoking the requested complementary service on the one or more files.

3. The data processing system of claim 2, wherein the computer-readable medium further comprises instructions for causing the processor to perform operations comprising:
   confirming, prior to invoking the requested complementary service, that the current operating status of the file collaboration platform permit the requested complementary service to be invoked; and
   temporarily delaying invoking the requested complementary service until the current operating status of the file collaboration platform improves sufficiently to permit the requested complementary service to be invoked.

4. The data processing system of claim 2, wherein the computer-readable medium further comprises instructions for causing the processor to perform operations comprising:
   determining that the requested complementary service has been completed on the one or more files;
   deallocating the capacity from the request; and
   updating an available capacity of the file collaboration platform responsive to deallocating the capacity from the request.

5. The data processing system of claim 1, wherein to determine the current operating status of the file collaboration platform, the computer-readable medium further comprises instructions for causing the processor to perform operations comprising:
   determining metrics of the current operating status of the file collaboration platform for the feature-specific policy including a current CPU utilization of the file collaboration platform, a current memory utilization of the file collaboration platform, a health of one or more servers of the file collaboration platform, a position of the request within a queue, a time of day, a day of week, or a combination thereof.

6. The data processing system of claim 1, wherein to determine the current operating status of the file collaboration platform, the computer-readable medium further comprises instructions for causing the processor to perform operations comprising:
receiving, at the file collaboration platform, a second request from the client device to invoke a second requested complementary service on one or more files;
responsive to the request handler module determining that the second requested complementary service is not allowed based on the current operating status of the file collaboration platform and the feature-specific policy associated with the feature of the requested complementary service, generating a second message to the client device indicating that the second request is not allowed but the client device may resubmit the second request after a first period of time specified in the second message has elapsed; and
sending the second message to the client device.

7. The data processing system of claim 1, wherein the computer-readable medium further comprises instructions for causing the processor to perform operations comprising:
receiving at a slot manager a request message and associated files from the client device after sending the first message to the client device, the request message indicating that the client device may invoke the requested complementary service;
determining via the slot manager whether the request handler module allocated a slot for the request message when allocating available capacity in response to moving the request to the active queue; and
processing the request message from the client device responsive to a determination that the request handler module allocated the slot for the request message.

8. A method implemented in a data processing system for processing requests for features at a file collaboration platform, the method comprising:
receiving, at the file collaboration platform, a request from a client device to invoke a requested complementary service on one or more files, wherein the requested complementary service is associated with a feature provided by the file collaboration platform that enhances a user experience, is complementary to the file collaboration platform, and is time insensitive;
in response to receiving the request, adding the request by a request handler module to a wait queue, wherein the wait queue holds requests received by the file collaboration platform that are waiting for the request handler module to determine whether the requests are allowed to be processed by the file collaboration platform;
determining a current operating status of the file collaboration platform;
obtaining a feature-specific policy associated with the feature associated with the requested complementary service of the file collaboration platform, wherein the feature-specific policy includes metrics of the current operating status of the file collaboration platform and the feature-specific policy is used to determine whether to allow or block a particular request for the requested complementary service from the client device to the file collaboration platform;
determining by the request handler module whether the requested complementary service is allowed by the file collaboration platform based on the current operating status of the file collaboration platform and the feature-specific policy associated with the feature;
moving the request from the wait queue to an active queue responsive to the request handler module determining that the requested complementary service is allowed based on the current operating status of the file collaboration platform and the feature-specific policy associated with the feature of the requested complementary service, wherein the active queue holds requests that have been approved for processing by the file collaboration platform;
allocating capacity to the request at the file collaboration platform for performing the request responsive to determining that the requested complementary service is allowed; and
sending a first message to the client device indicating that the client device may invoke the requested complementary service.

9. The method of claim 8, further comprising:
receiving, from the client device, a first response to the first message invoking the requested complementary service;
receiving, from the client device, the one or more files on which the requested complementary service is to be performed by the file collaboration platform; and
invoking the requested complementary service on the one or more files.

10. The method of claim 9, further comprising:
confirming, prior to invoking the requested complementary service, that the current operating status of the file collaboration platform permit the requested complementary service to be invoked; and
temporarily delaying invoking the requested complementary service until the current operating status of the file collaboration platform improves sufficiently to permit the requested complementary service to be invoked.

11. The method of claim 9, further comprising:
determining that the requested complementary service has been completed on the one or more files;
deallocating the capacity from the request; and
updating an available capacity of the file collaboration platform responsive to deallocating the capacity from the request.

12. The method of claim 8, wherein determining the current operating status of the file collaboration platform further comprises:
determining a current CPU utilization of the file collaboration platform, a current memory utilization of the file collaboration platform, a health of one or more servers of the file collaboration platform, or a combination thereof.

13. The method of claim 8, wherein determining the current operating status of the file collaboration platform further comprising:
receiving, at the file collaboration platform, a second request from the client device to invoke a second requested complementary service on one or more files;
responsive to the request handler module determining that the second requested complementary service is not allowed based on the current operating status of the file collaboration platform and the feature-specific policy associated with the feature of the requested complementary service, generating a second message to the client device indicating that the second request is not allowed but the client device may resubmit the request after a first period of time specified in the second message has elapsed; and sending the second message to the client device.

14. The method of claim 8, further comprising:

receiving at a slot manager a request message and associated files from the client device after sending the first message to the client device, the request message indicating that the client device may invoke the requested complementary service;

determining via the slot manager whether the request handler module allocated a slot for the request message when allocating available capacity in response to moving the request to the active queue; and processing the request message from the client device responsive to a determination that the request handler module allocated the slot for the request message.

15. A machine-readable storage medium on which are stored instructions that, when executed, cause a processor of a programmable device to perform functions of:

receiving, at a file collaboration platform, a request from a client device to invoke a requested complementary service on one or more files, wherein the requested complementary service is associated with a feature provided by the file collaboration platform that enhances a user experience, is complementary to the file collaboration platform, and is time insensitive;

in response to receiving the request, adding the request by a request handler module to a wait queue, wherein the wait queue holds requests received by the file collaboration platform that are waiting for the request handler module to determine whether the requests are allowed to be processed by the file collaboration platform;

determining a current operating status of the file collaboration platform;

obtaining a feature-specific policy associated with the feature associated with the requested complementary service of the file collaboration platform, wherein the feature-specific policy includes metrics of the current operating status of the file collaboration platform and the feature-specific policy is used to determine whether to allow or block a particular request for a complementary service from the client device to the file collaboration platform;

determining by the request handler module whether the requested complementary service is allowed by the file collaboration platform based on the current operating status of the file collaboration platform and the feature-specific policy associated with the feature;

moving the request from the wait queue to an active queue responsive to the request handler module determining that the requested complementary service is allowed based on the current operating status of the file collaboration platform and the feature-specific policy associated with the feature of the requested complementary service, wherein the active queue holds requests that have been approved for processing by the file collaboration platform;

updating an available capacity of the file collaboration platform in response to moving the request to the active queue;

allocating capacity to the request at the file collaboration platform for performing the request responsive to determining that the requested complementary service is allowed; and sending a first message to the client device indicating that the client device may invoke the requested complementary service.

16. The machine-readable storage medium of claim 15, wherein the machine-readable storage medium further comprises instructions for causing the processor to perform operations comprising:

receiving, from the client device, a first response to the first message invoking the requested complementary service;

receiving, from the client device, the one or more files on which the requested complementary service is to be performed by the file collaboration platform; and invoking the requested complementary service on the one or more files.

17. The machine-readable storage medium of claim 16, wherein the machine-readable storage medium further comprises instructions for causing the processor to perform operations comprising:

confirming, prior to invoking the requested complementary service, that the current operating status of the file collaboration platform permit the requested complementary service to be invoked; and temporarily delaying invoking the requested complementary service until the current operating status of the file collaboration platform improves sufficiently to permit the requested complementary service to be invoked.

18. The machine-readable storage medium of claim 16, wherein the machine-readable storage medium further comprises instructions for causing the processor to perform operations comprising:

determining that the requested complementary service has been completed on the one or more files;

deallocating the capacity from the request; and updating an available capacity of the file collaboration platform responsive to deallocating the capacity from the request.

19. The machine-readable storage medium of claim 15, wherein the machine-readable storage medium further comprises instructions for causing the processor to perform operations comprising:

adding the request to a first queue in response to receiving the request, wherein the first queue holds requests received by the file collaboration platform; and moving the request from the first queue to a second queue, wherein the second queue holds requests that have been approved for processing by the file collaboration platform.

20. The machine-readable storage medium of claim 15, wherein to determine the current operating status of the file collaboration platform, the machine-readable storage medium further comprises instructions for causing the processor to perform operations comprising:

determining a current CPU utilization of the file collaboration platform, a current memory utilization of the file collaboration platform, a health of one or more servers of the file collaboration platform, or a combination thereof.

21. The machine-readable storage medium of claim 15, wherein the machine-readable storage medium further comprises instructions for causing the processor to perform operations comprising:

receiving at a slot manager a request message and associated files from the client device after sending the first message to the client device, the request message indicating that the client device may invoke the requested complementary service;

determining via the slot manager whether the request handler module allocated a slot for the request message when allocating available capacity in response to moving the request to the active queue; and processing the request message from the client device responsive to a determination that the request handler module allocated the slot for the request message.

* * * * *